(12) United States Patent
Quijin

(10) Patent No.: US 7,344,416 B2
(45) Date of Patent: Mar. 18, 2008

(54) CONNECTOR FOR RECEIVING DIFFERENT SIZES OF MEMORY CARDS

(75) Inventor: Hao Quijin, Kunshan (CN)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/557,872

(22) PCT Filed: May 21, 2004

(86) PCT No.: PCT/US2004/016078

§ 371 (c)(1),
(2), (4) Date: Nov. 21, 2005

(87) PCT Pub. No.: WO2005/027021

PCT Pub. Date: Mar. 24, 2005

(65) Prior Publication Data

US 2007/0042617 A1    Feb. 22, 2007

(30) Foreign Application Priority Data

May 21, 2003    (CN) ............................ 03 2 56977 U

(51) Int. Cl.
*H01R 24/00*    (2006.01)
(52) U.S. Cl. .................................... 439/630; 439/540.1
(58) Field of Classification Search ................. 439/64, 439/377, 540.1, 630
See application file for complete search history.

(56) References Cited

U.S. PATENT DOCUMENTS

| 6,115,244 A * | 9/2000 | Chen et al. ................. 361/684 |
| 6,540,523 B1 * | 4/2003 | Kung et al. ................... 439/64 |
| 6,817,886 B2 * | 11/2004 | Amorim ...................... 439/377 |
| 7,081,021 B1 * | 7/2006 | Ting ........................... 439/630 |

* cited by examiner

*Primary Examiner*—Thanh-Tam Le

(74) *Attorney, Agent, or Firm*—Charles S. Cohen

(57) ABSTRACT

A memory card connector includes an insulative housing having a rear terminal-mounting section defining at least part of a receptacle for receiving a mating end of one or more memory cards. A pair of side wall sections extend forwardly from opposite ends of the rear section. A center section extends forwardly from the rear section between the side wall sections. A plurality of conductive terminals are mounted on the rear terminal-mounting section for engaging appropriate contacts on the memory card(s) when inserted into the receptacle. Therefore, a larger-size memory card can be inserted into the receptacle of the rear terminal-mounting section between the side wall sections and over the center section, and one or two reduced-size memory cards can be inserted between the side wall sections and the center section.

11 Claims, 8 Drawing Sheets

CONNECTOR FOR RECEIVING DIFFERENT SIZES OF MEMORY CARDS

FIELD OF THE INVENTION

This invention generally relates to the art of electrical connectors and, particularly, to a memory card connector for accommodating different sized memory cards.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

A typical memory card connector includes an insulating housing structure usually having a lateral terminal-mounting section across the rear of the connector. The contacts or terminals of the connector are mounted on this lateral section. The housing may have one or two legs projecting at right angles forwardly from one or both sides or ends of the lateral section. The insulating housing of such connectors typically is molded of dielectric plastic material into the desired shape. The terminals are stamped and formed of a sheet metal material having a high resiliency, such as phosphor bronze. The connector often is mounted on the top surface of a printed circuit board, and solder tail portions of the terminals are connected, as by a reflow soldering process, to appropriate circuit traces on the board.

FIG. 1 shows a memory card connector, generally designated 16, according to the prior art as described above and mounted on a printed circuit board 18. The connector includes a dielectric housing, generally designated 20, which includes a rear terminal-mounting section 22 and a pair of side wall sections 24 extending forwardly from opposite ends of the rear section to define a receiving space 26 for receiving a memory card 28 inserted thereinto in the direction of arrow "A". The rear section 22 mounts a plurality of terminals 29 for engaging appropriate contacts on the memory card when inserted into the connector.

It can be seen that conventional memory card connectors as represented by the prior art connector in FIG. 1 have the capability of receiving only one size of memory card. If a different sized card is to be used, a completely different connector must be provided. This creates problems in manufacturing costs, multiple inventory expenses and, in fact, confusion in the field. There is a need for a memory card connector which can receive different sizes of memory cards, such as a conventional larger memory card as well as one or more reduced-size memory cards. The present invention is directed to solving these problems and satisfying the stated need.

SUMMARY OF THE INVENTION

An object, therefore, of the invention is to provide a new and improved memory card connector for receiving different sizes of memory cards.

In the exemplary embodiment of the invention, the connector includes an insulative housing having a rear terminal-mounting section defining at least part of a receptacle for receiving a mating end of one or more memory cards. A pair of side wall sections extend forwardly from opposite ends of the rear section. A center section extends forwardly from the rear section between the side wall sections. A plurality of conductive terminals are mounted on the rear terminal-mounting section for engaging appropriate contacts on the memory card(s) when inserted into the receptacle. Therefore, a larger-size memory card can be inserted into the receptacle of the rear terminal-mounting section between the side wall sections and over the center section, and one or two reduced-size memory cards can be inserted between the side wall sections and the center section.

According to certain aspects of the invention, the side wall sections have upstanding guide walls for guiding the larger-size memory card into the receptacle. The center section has a guide rib combining with the side walls for guiding the reduced-size memory card(s) into the receptacle. The larger-size memory card has a groove in the underside thereof for accommodating the guide rib.

According to other aspects of the invention, the terminals are divided into two groups on opposite sides of the center section. The side wall sections and the center section are detachably mounted to the rear terminal-mounting section. Each of the side wall sections and the center section includes means for mounting the section to a printed circuit board.

In one embodiment of the invention, the rear terminal-mounting section, the side wall sections and the center section all are molded of dielectric plastic material. In another embodiment, the rear section is molded of dielectric plastic material, while the side wall sections and the center section are stamped and formed of sheet metal material.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
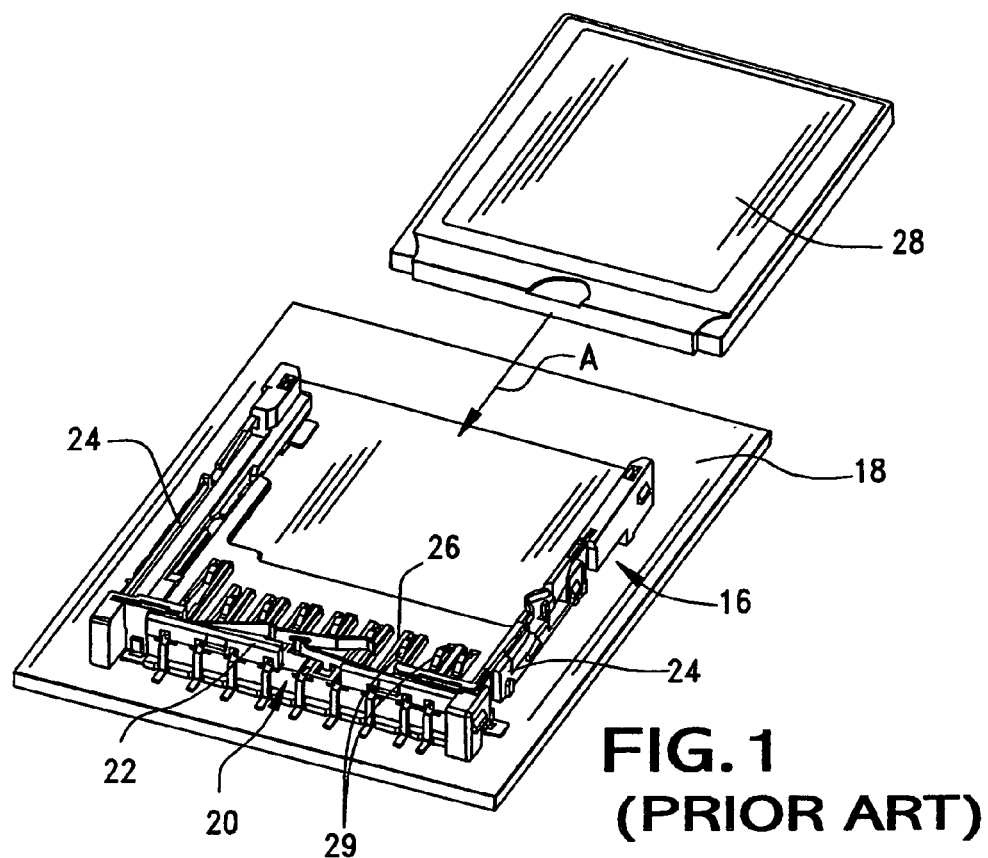
FIG. 1 is a perspective view of a prior art memory card connector mounted on a circuit board for receiving a memory card, as described in the Background, above.

Referring to the drawings in greater detail, and first to FIGS. 2, 3 and 4, a first embodiment of a memory card connector, generally designated 30, includes an insulative housing, generally designated 32, having an elongated rear terminal-mounting section 34 defining a receptacle 36 for receiving a mating end of a memory card, as described hereinafter. A pair of longitudinal side wall sections, generally designated 38, extend forwardly from opposite ends of the rear section. A center wall section, generally designated 40, extends forwardly from a mid-point of the rear section to divide receptacle 36 into two portions for receiving a pair of reduced-size memory cards (described hereinafter) between the center wall section and the two side wall sections.

A plurality of conductive terminals 42 are mounted on rear section 34 of the housing for engaging appropriate contacts at the mating end of the memory card(s) when inserted into receptacle 36. The terminals are divided into two groups on opposite sides of center wall section 40 as can be seen clearly in FIGS. 2-4.

Rear terminal-mounting section 34 is a one-piece structure molded of dielectric plastic material. The rear section is elongated and includes a pair of end supports 34a. A pair of end connecting fingers 34b project forwardly from end supports 34a, and a third or center connecting finger 34c projects forwardly from the rear section at a mid-point thereof. A guide finger 36d projects forwardly from a mid-point of the rear section, aligned above center connecting finger 34c and within receptacle 36. The housing is fixed to a circuit board, described hereinafter, by metal "fitting nails" 43 at opposite ends of rear section 34.

Each side wall section 38 also is a one-piece structure and is molded of dielectric plastic material. Each side wall section is generally L-shaped in cross section and includes an upright side wall 38a and an inwardly projecting bottom wall 38b. As viewed in the drawings, the side wall is generally vertical and the bottom wall is generally horizontal. The side walls are guide walls for the memory card(s). A pair of cut-outs or recesses 38c are formed in the inside surface of the vertical side wall. A pair of chamfered latch bosses 38d project outwardly from the outside of the side wall. A pair of positioning pins 38e project downwardly from the bottom of the horizontal bottom wall, and pairs of holes 38f are formed through the bottom wall. A pair of mounting posts 38g project downwardly from bottom wall 38b for mounting the side wall section in a pair of holes in a printed circuit board, as will be seen hereinafter. A rear positioning notch 38h is formed in the bottom wall immediately adjacent the inside surface of the side wall, and a similar notch 38i is formed at the front of the bottom wall. Notches 38i are card stabilizing notches.

Center wall section 40 is molded of plastic material and includes a pair of mounting posts 40a projecting from the bottom thereof for insertion into appropriate mounting holes in the printed circuit board. A plurality of positioning pins 40b also project downwardly from the center wall section. A front card stabilizing notch 40c and a rear notch 40d are formed in opposite ends of the center wall section. Finally, a partition rib 40e runs the length of the center wall section. The partitioning rib is a guide rib for the reduced-size memory cards, as will be seen hereinafter.

Figure 2:
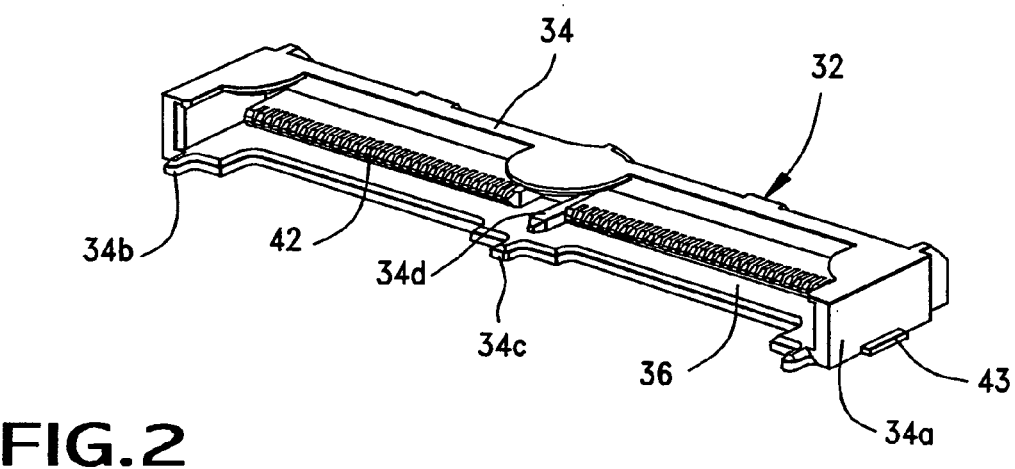
FIG. 2 is a perspective view of the rear terminal-mounting section of the housing of the memory card connector according to the invention.
Figures 3, 4:
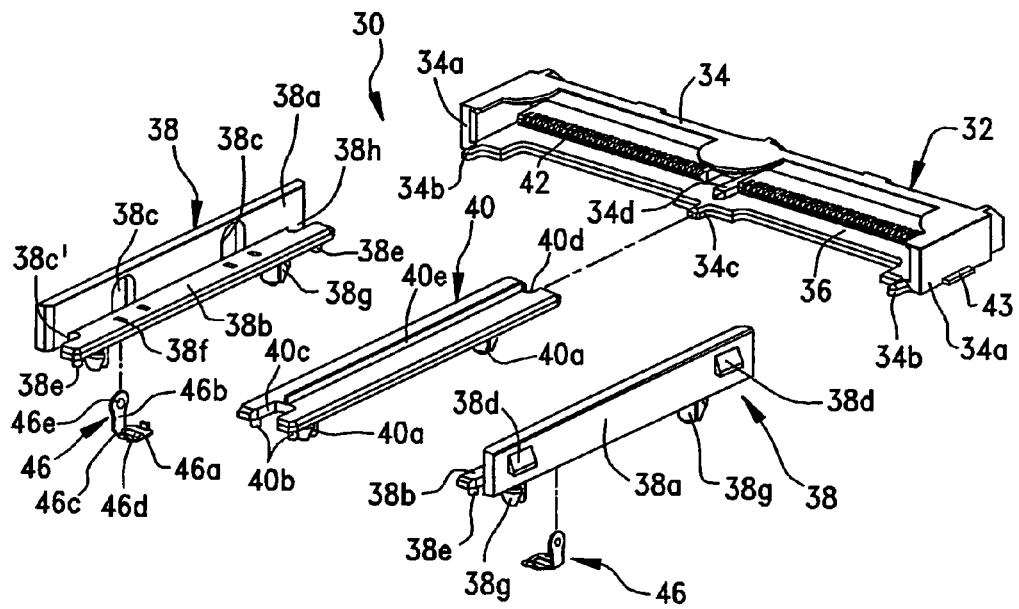
FIG. 3 is an exploded perspective view of a memory card connector according to the invention with the components thereof in disassembled condition.
FIG. 4 is a perspective view similar to that of FIG. 3, with the connector in assembled condition.

Still referring to FIGS. 2-4, at least one, or more, grounding members, generally designated 46, are mounted in side wall sections 38. Two grounding members are shown, but four grounding members can be mounted in the side wall sections. Each grounding member 46 is generally L-shaped and includes a generally horizontal base 46a and a vertical or upright arm 46b. A pair of side wings 46c project upwardly from opposite side edges of the base. A downwardly projecting detent 46d is embossed or formed from base 46a, and an inwardly projecting detent 46e is embossed or formed out of upright arm 46b.

Grounding members 46 are assembled to side wall sections 48 by pushing each grounding member upwardly through a hole into the bottom of a respective side wall section so that the upright arm 46b of the grounding member becomes inserted into a respective one of the recesses 38c in the side wall section. This can be seen in FIG. 4. When fully inserted, side wings 46c of the grounding member are press-fit into a pair of the holes 38f of the side wall section. When fully inserted, the inwardly projecting detents 46e on the upright arms will engage grounding contacts on the memory card(s). Side walls 38a of the side wall sections, within recesses 38c, provide rigid back up means for arms 46b and detents 46e of the grounding members. The bottom walls 38b of the side wall sections lay on top of the bases 46a of grounding members 46. The downwardly projecting detents 46d on the bases of the grounding members will engage grounding circuit pads on the printed circuit board. Therefore, the memory card(s) are grounded to the circuit board through grounding members 46 which are mounted on side wall sections 38, as described. Inwardly protruding detents 46e and downwardly protruding detents 46d establish a more positive contact engagement with the memory card and the circuit board, respectively.

The rear terminal-mounting section 34 of housing 32 is detachably assembled to side wall sections 38 and center wall section 40 as shown in FIG. 4. During assembly, end connecting fingers 34b (FIGS. 2 and 3) of the rear section are press-fit into rear positioning notches 38h at the rear of the side wall sections. In addition, center connecting finger 34c of the rear section is press-fit into rear notch 40d of center wall section 40, as shown.

Figure 5:
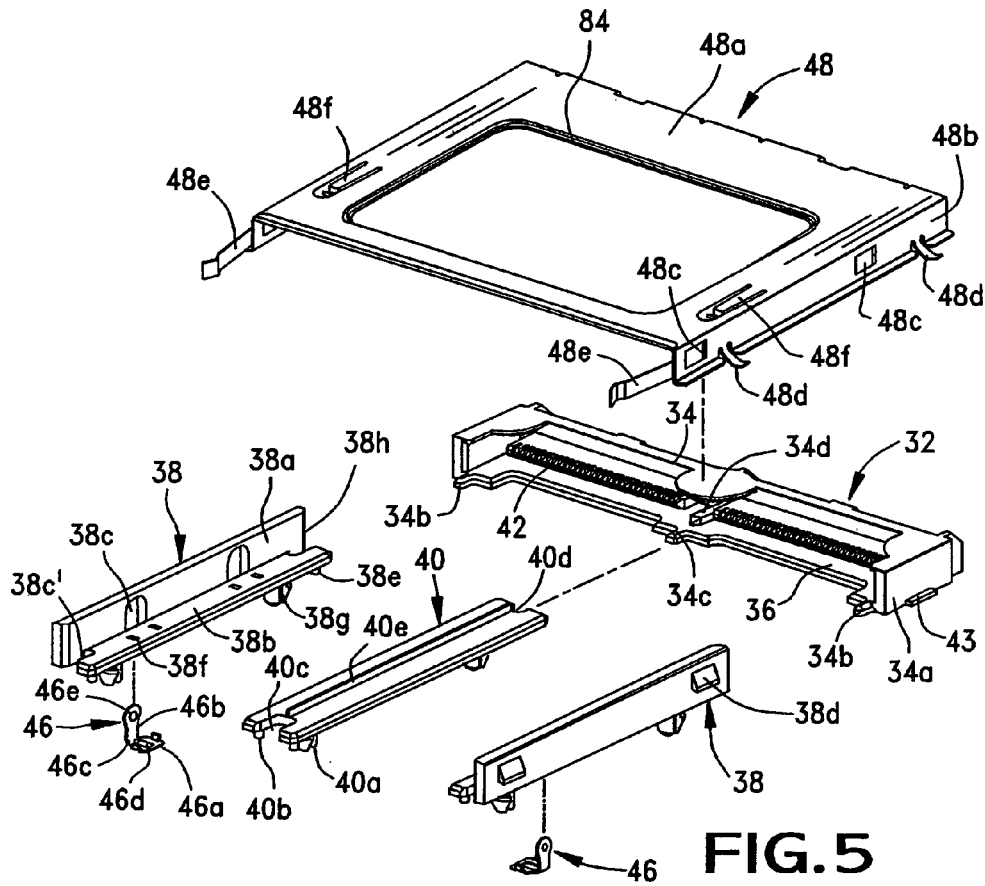
FIG. 5 is an exploded perspective view similar to that of FIG. 3, on a reduced scale and including a cover for the connector.

FIG. 5 shows a cover 48 for positioning onto housing 32 of the memory card connector. Specifically, the cover is stamped and formed of sheet metal material and includes a top wall 48a and a pair of side walls 48b. The side walls overlie side wall sections 38 and end supports 34a of rear section 34 of the housing. A pair of latch openings 48c are formed in each side wall. A pair of grounding tabs 48d project outwardly from the bottom of each side wall. A pair of latch arms 48e project forwardly from each side wall. Finally, a pair of cantilevered grounding arms 48f are stamped and formed out of the top wall at opposite sides thereof. When cover 48 is assembled, latch openings 48c snap into latching engagement with the chamfered latch bosses 38d of side wall sections 38. Grounding tabs 48d of the cover form solder tails for fixing the cover to the circuit board and also grounding the cover to the board to provide good shielding and EMI protection for the connector. Cantilevered grounding arms 48f engage ground portions on top of the memory card(s) and latch arms 48e hold the memory card(s) in the connector.

Figure 7:
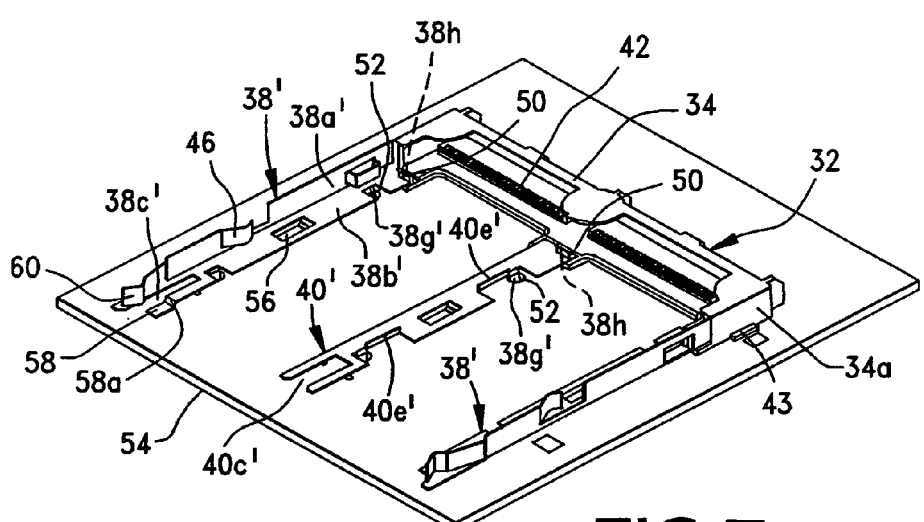
FIG. 7 is a perspective view of the connector of FIG. 6 in assembled condition and mounted to the circuit board.
Figure 6:
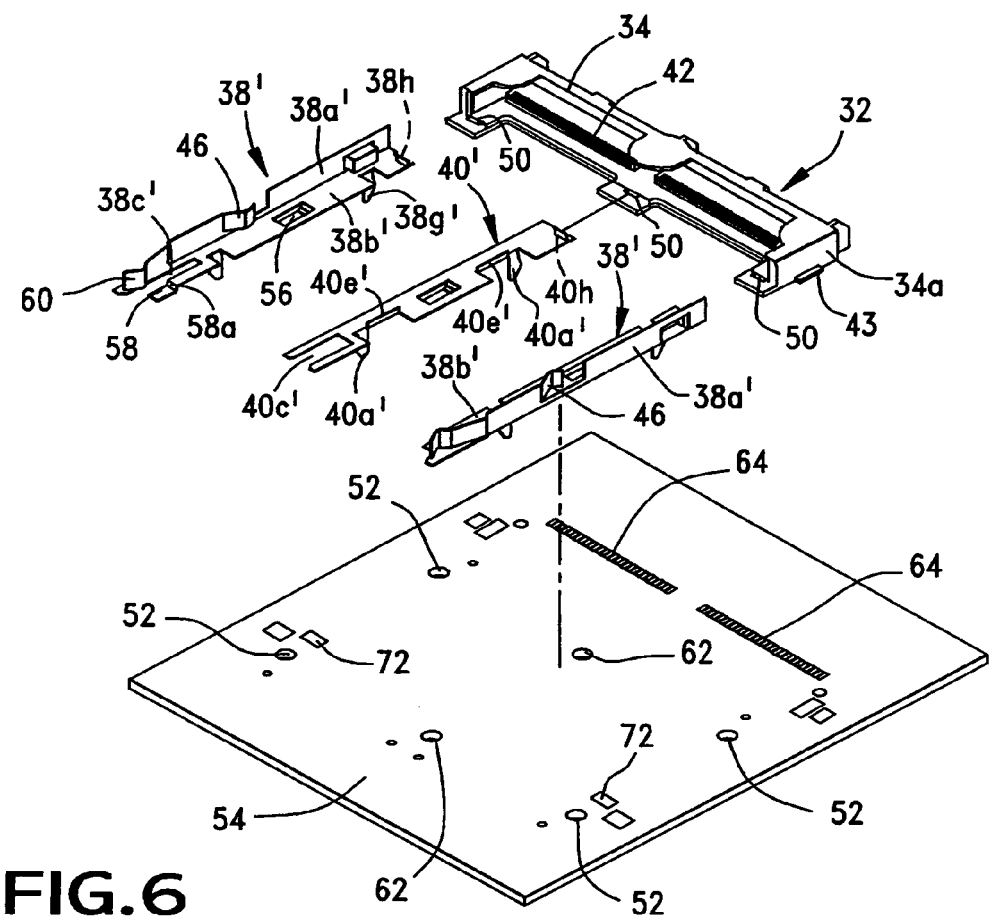
FIG. 6 is an exploded perspective view of another embodiment of a memory card connector according to the invention, with the side wall sections and center wall section fabricated of metal material, in conjunction with an accompanying circuit board.

FIGS. 6 and 7 show another embodiment of the invention wherein a pair of side wall sections 38' and a center wall section 40' are stamped and formed of sheet metal material. The metal wall sections are similar in function to plastic wall sections 38 and 40. Each metal side wall section includes a vertical side wall 38a' and a horizontal bottom wall 38b'. Each metal side wall section includes a downwardly projecting rear connecting flange 38h which is positioned in a connecting slot 50 at an end of rear section 34 of housing 32 to detachably interconnect the side wall sections to the rear section. Each metal side wall section has a pair of mounting posts 38g' for insertion into a pair of mounting holes 52 in a printed circuit board 54. The metal side wall section has an inwardly bent grounding tab 46' which, in essence, replaces the grounding members 46 of the first embodiment. A downwardly embossed detent 56 is formed out of the bottom wall to engage the top of the circuit board to maintain the side wall section at a proper height. A notch 38i' is formed at the front of the bottom wall. A guide arm 58, having a slanted surface 58a, is formed out of the bottom wall, and a latch arm 60 is formed out of the vertical side wall. As seen in FIG. 7, guide arm 58 engages the top surface of circuit board 54, and slanted surface 58a of the guide arm guides the memory card(s) into the connector, while latch arm 60 will latch the card(s) in the connector. Metal center wall section 40' includes a pair of mounting posts 40a' for insertion into a pair of mounting holes in circuit board 54. A pair of upstanding positioning ribs 40e' are formed out of the center wall section.

At this point, it should be noted that FIG. 6 shows two linear groupings of circuit traces 64 on circuit board 54. These circuit traces are connected, as by soldering, to appropriate solder tails of the two groups of terminals 42. The solder tails of the terminals are not visible in the drawings.

Figure 8:
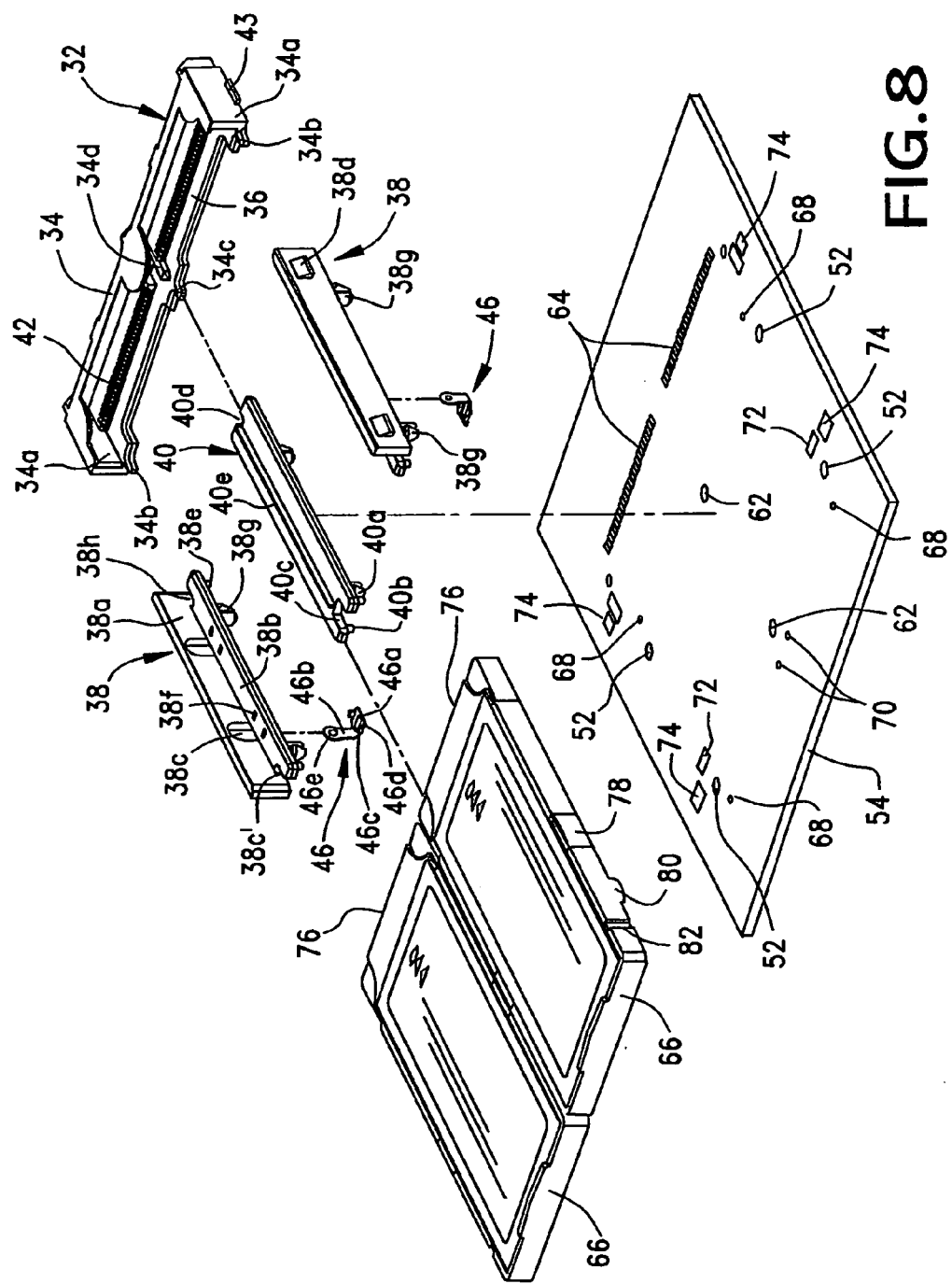
FIG. 8 is an exploded perspective view of the embodiment of FIGS. 3-5, in conjunction with a pair of reduced-size memory cards and a circuit board.
Figure 9:
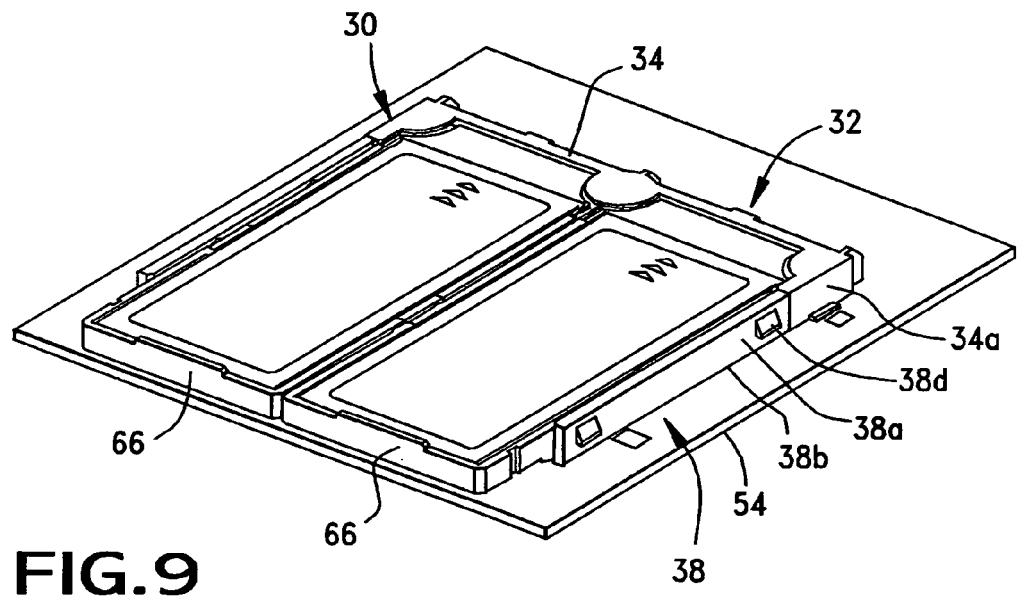
FIG. 9 is a perspective view of the two memory cards of FIG. 8 inserted into the assembled connector.

FIGS. 8 and 9 show memory card connector 30 in conjunction with circuit board 54, with FIG. 9 showing the connector mounted to the board. These two depictions also show a pair of reduced-size memory cards 66 for mounting in the connector. When the connector is mounted onto circuit board 54, mounting posts 38g of side wall sections 38 are inserted into mounting holes 52 of the circuit board, and positioning pins 38e of the side wall sections are inserted into positioning holes 68 in the circuit board. Mounting posts 40a of center wall section 40 are inserted into mounting holes 62 in the circuit board, while positioning pins 40b are inserted into positioning holes 70 in the circuit board. Detents 46d on bases 46a of grounding members 46 will engage a pair of ground pads 72 on the circuit board. Grounding tabs 48d (FIG. 5) of cover 48 will engage ground pads 74 on the circuit board.

Still referring to FIGS. 8 and 9, each reduced-size memory card 66 includes a recessed mating end 76 which contains appropriate contacts for engaging the two groups of terminals 42. The sides of the memory cards include ground contacts 78 for engaging the embossed detents 46e on upright arms 46b of ground members 46. Cantilevered grounding arms 48f of cover 48 engage the top edges of ground contacts 78. The memory cards are provided with downwardly depending stabilizing projections 80 which are positioned into the front stabilizing notches 38i of side wall sections 38 and into forward stabilizing notch 40c of center wall section 40 to prevent the memory cards from shifting in the connector. Each memory card also includes a notch 82 in each opposite side thereof near the front end of the memory card for receiving latch arms 48e of cover 48 and/or latch arms 60 (FIGS. 6 and 7) of metal side wall sections 38'.

Figure 10:
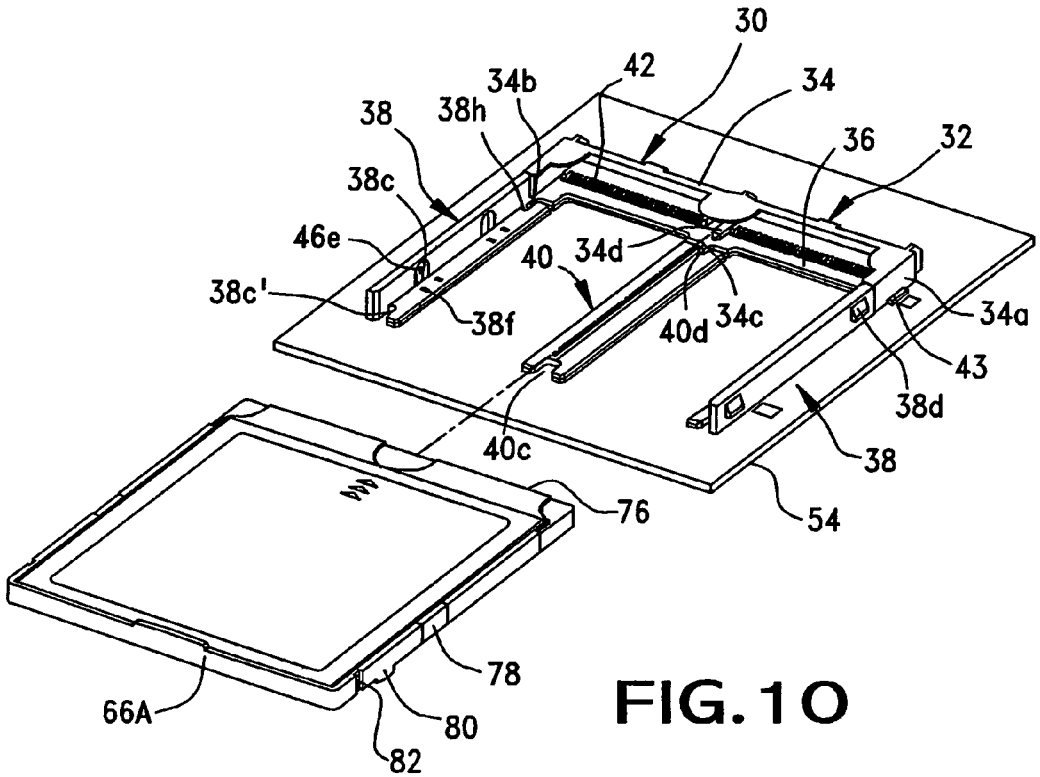
FIG. 10 is a perspective view of the connector mounted on the circuit board and about to receive a single memory card.

FIG. 10 shows a single, larger memory card 66A for insertion into memory card connector 30 mounted on circuit board 54. The larger memory card has a recessed mating end 76 with arrays of contacts for engaging the two groups of terminals 42. Like the reduced-size memory cards 66, memory card 66A has ground contacts 78 on opposite sides thereof, as well as stabilizing projections 80 and notches 82.

Figure 11:
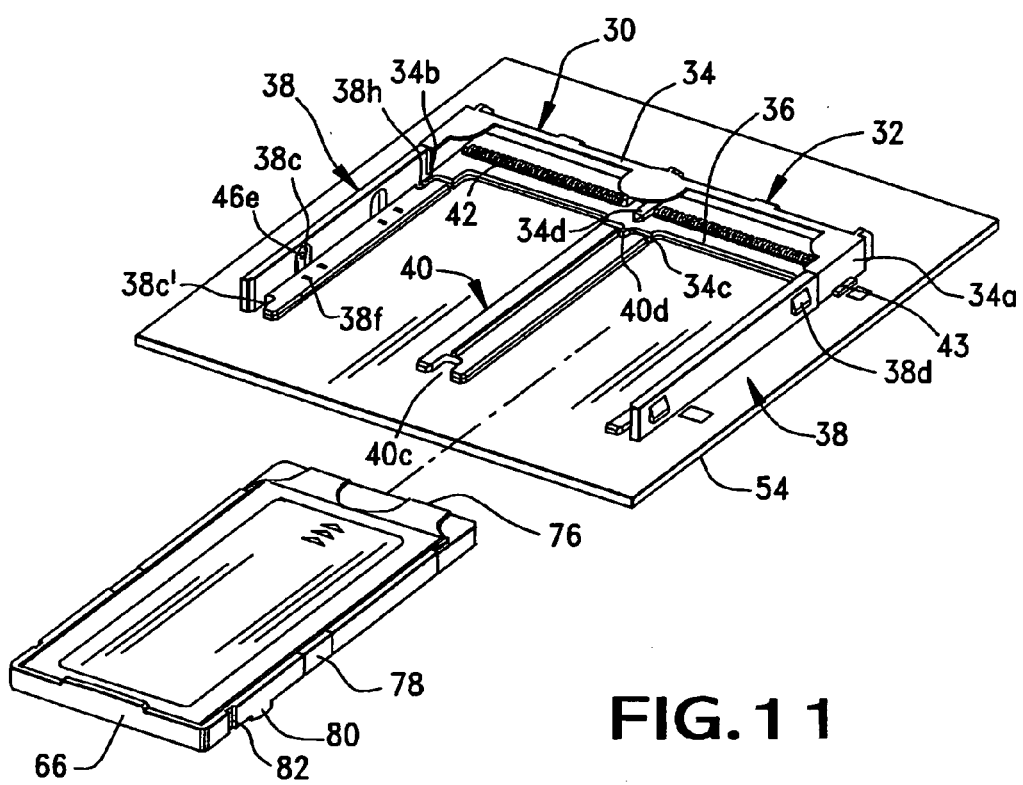
FIG. 11 is a view similar to that of FIG. 10, but with the connector about to receive a single reduced-size memory card.

FIG. 11 simply shows that memory card connector 30 can be used to receive a single reduced-size memory card 66 and does not necessarily have to receive two reduced-size cards. In other words, the connector can receive one or two reduced-size cards or one larger size card.

Figure 12:
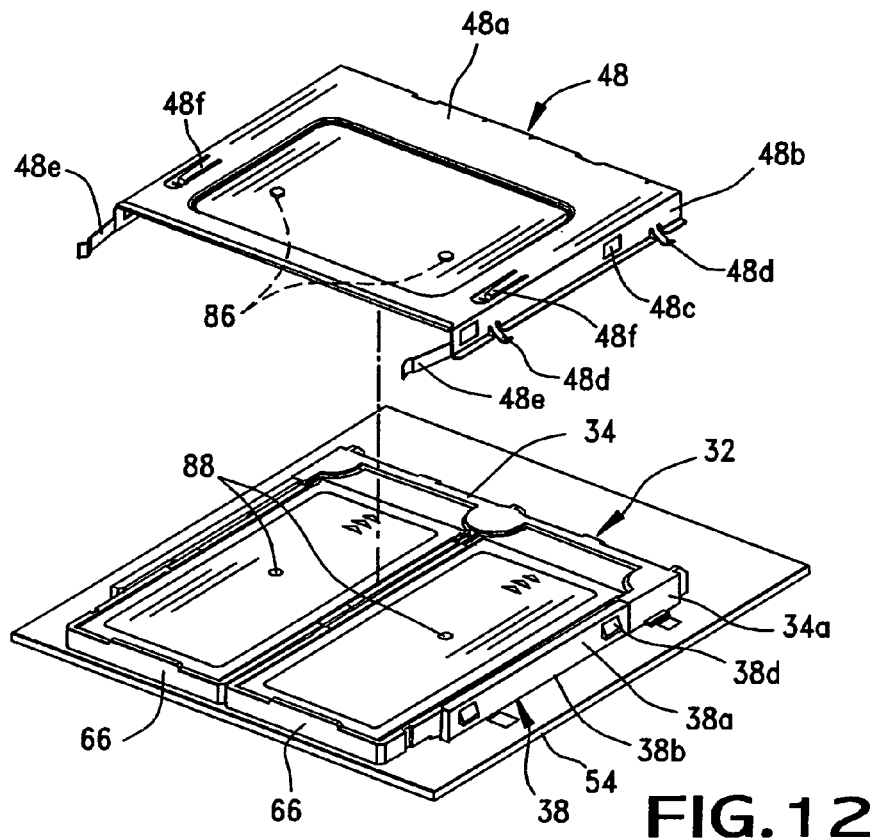
FIG. 12 is a view similar to that of FIG. 9, but showing a cover for the connector.

FIG. 12 shows that cover 48 has a large recessed, downwardly projecting area 84 which also can be seen in FIG. 4. In FIG. 11, a pair of downwardly projecting protrusions 86 are formed on the underside of the cover for insertion into a pair of recesses 88 in the top surfaces of memory cards 66. The interengagement of these protrusions and recesses fix the positions of the memory cards and help prevent the cards from shifting around when fully inserted into the connector.

Figure 13:
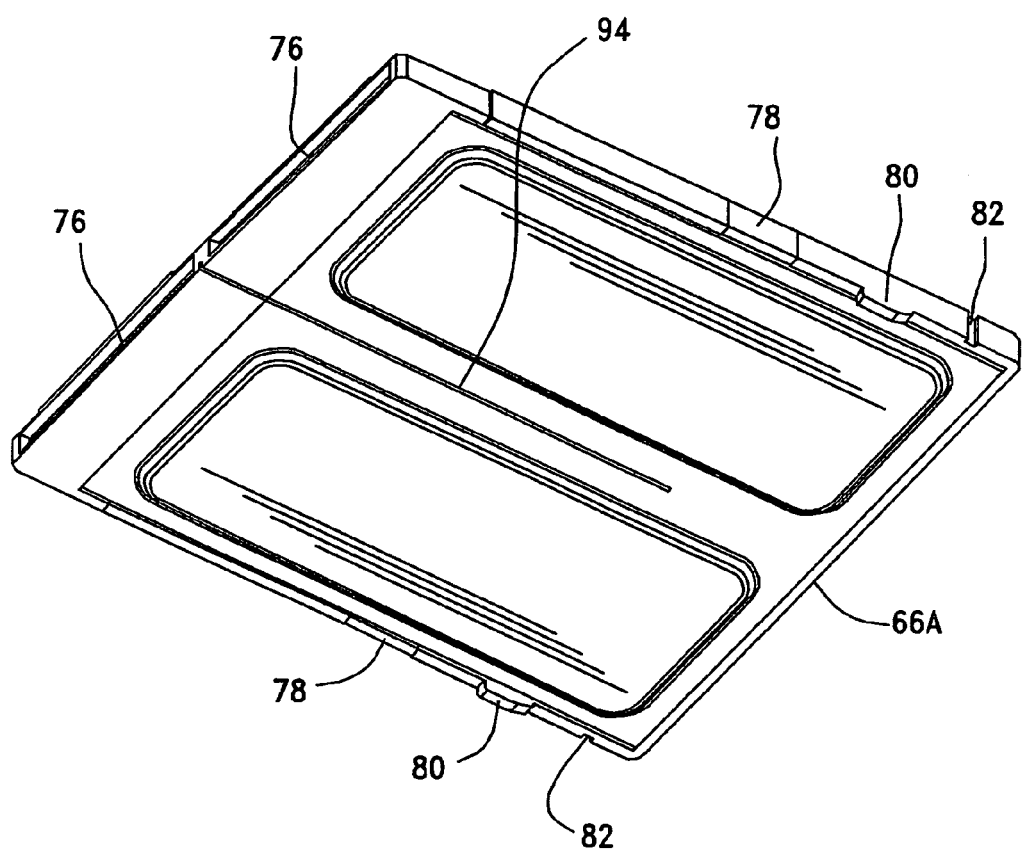
FIG. 13 is a bottom perspective view of the memory card shown in FIG. 10.

FIG. 13 shows that the larger memory card 66A has a groove 94 in the underside thereof to accommodate the positioning rib 40e of center wall section 40 or the positioning ribs 40e' of the metal center wall section 40'.

Figure 14:
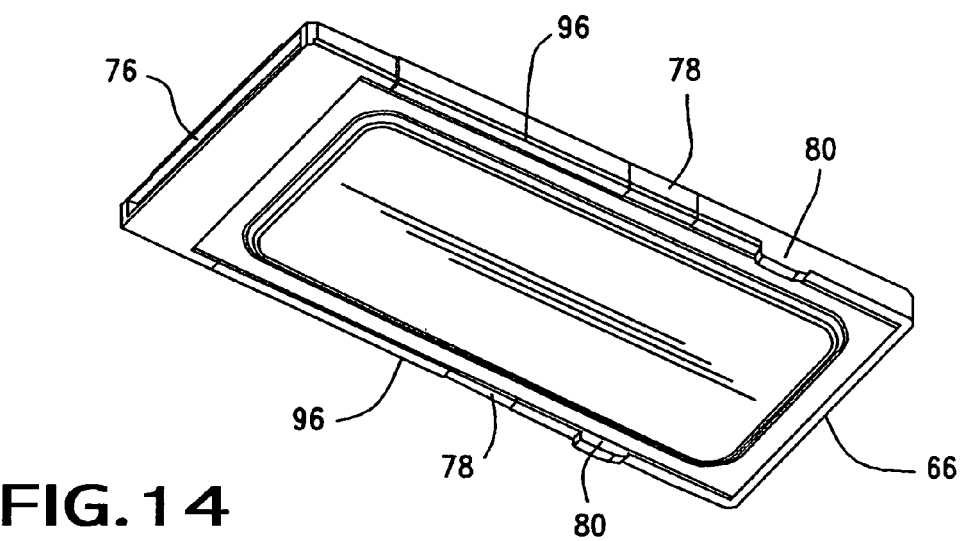
FIG. 14 is a bottom perspective view of the reduced-size memory card shown in FIG. 11 and other selected views.

FIG. 14 shows that the reduced-size memory cards 66 are provided with elongated notches 96 to accommodate the positioning rib 40e of center wall section 40 or the positioning ribs 40e' of metal center wall sections 40'.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:
   a housing having an insulative rear terminal-mounting section defining at least part of a receptacle for receiving a mating end of one or more memory cards, a pair of side wall sections extending forwardly from opposite ends of the rear section, and a center section extending forwardly from the rear section between the side wall sections;
   a plurality of conductive terminals mounted on the rear terminal-mounting section of the housing for engaging appropriate contacts on the memory card(s) when inserted into the receptacle; and
   whereby a larger-size memory card can be inserted into the receptacle of the rear terminal-mounting section between the side wall sections and over the center section, and one or two reduced-size memory cards can be inserted between the side wall sections and the center section;

wherein the center section has a guide rib for guiding the reduced-size memory cards into the receptacle; and wherein the larger-size memory card has a groove in an underside thereof for accommodating the guide rib.

2. The memory card connector of claim 1 wherein said side wall sections have upstanding guide walls for guiding the larger-size memory card into the receptacle.

3. The memory card connector of claim 1 wherein said terminals are divided into two groups on opposite sides of said center section.

4. The memory card connector of claim 1 wherein said side wall sections and said center section are detachably mounted to the rear terminal-mounting section.

5. The memory card connector of claim 4 wherein each of said side wall sections and the center section includes means for mounting the section to a printed circuit board.

6. The memory card connector of claim 1 wherein said rear terminal-mounting section, side wall sections and center section all are molded of dielectric plastic material.

7. A memory card connector, comprising:

a housing having an insulative rear terminal-mounting section defining at least part of a receptacle for receiving a mating end of one or more memory cards, a pair of side wall sections extending forwardly from opposite ends of the rear section, a center section extending forwardly from the rear section between the side wall sections, the side wall sections having upstanding guide walls and the center section having a guide rib;

a plurality of conductive terminals mounted on the rear terminal-mounting section of the housing and divided into two groups on opposite sides of said center section for engaging appropriate contacts on the memory card(s) when inserted into the receptacle; and whereby a larger-size memory card can be inserted into the receptacle of the rear terminal-mounting section between the side wall sections and over the center section as the upstanding guide walls of the side wall sections guide the larger-size memory into the receptacle, and one or two reduced-size memory cards can be inserted between the upstanding guide walls of the side wall sections and the guide rib of the center section.

8. In combination with the memory card connector of claim 7 wherein said larger-size memory card has a groove in the underside thereof for accommodating said guide rib.

9. The memory card connector of claim 7 wherein said side wall sections and said center section are detachably mounted to the rear terminal-mounting section.

10. The memory card connector of claim 9 wherein each of said side wall sections and the center section includes means for mounting the section to a printed circuit board.

11. The memory card connector of claim 7 wherein said rear terminal-mounting section, side wall sections and center section all are molded of dielectric plastic material.

\* \* \* \* \*